United States Patent [19]  [11] 3,936,831
Jones  [45] Feb. 3, 1976

[54] SINGLE PULSE TOA MEASUREMENT SYSTEM
[75] Inventor: Gerald N. Jones, Inyokern, Calif.
[73] Assignee: The United States of America as represented by the Secretary of the Navy, Washington, D.C.
[22] Filed: Dec. 15, 1971
[21] Appl. No.: 210,265

[52] U.S. Cl. .......................... 343/113 R; 343/16 M
[51] Int. Cl.² ........................................... G01S 3/50
[58] Field of Search ......... 343/113, 16 M; 340/16 P

[56] References Cited
UNITED STATES PATENTS
2,489,304  11/1949  Marchand et al. .............. 343/113 R
2,535,255  12/1950  Barnes et al. ...................... 340/16 P
3,383,690  5/1968  Keller .............................. 343/113 R

Primary Examiner—Maynard R. Wilbur
Assistant Examiner—Richard E. Berger
Attorney, Agent, or Firm—R. S. Sciascia; Roy Miller; Gerald F. Baker

[57] ABSTRACT

A direction finding system which will provide, upon receipt of one single electromagnetic pulse, the direction of the emitter which produced that pulse with repsect to a fixed reference. This is done by measuring the time between the arrival of the pulse at two antennae.

The basic time measurement may be made for example by charging a capacitor at a fast linear rate during the interim period between the arrival of the pulse front edges. The first pulse starts the charging of this capacitor and the second pulse stops it. The result is a fast rising ramp whose height is proportional to the time delay. To allow differentiation between signal arrival from the right and left side of the center line of the fixed reference, and assuming a base leg between antennas of 24 feet, a fixed delay at 25 nsec is added to channel B such that the B pulse always arrives after the pulse in channel A.

6 Claims, 8 Drawing Figures

SINGLE PULSE TOA MEASUREMENT SYSTEM

BACKGROUND OF THE INVENTION

The need for direction finding in connection with the Target Identification and Acquisition System (TIAS) project brought about investigations into the possibilities of using a time of arrival (TOA) technique. The requirements were that the system must be capable of direction finding (DFing) on a single pulse, have a look angle of 120° (i.e. 60° on each side of bore sight) and have an angle resolution in tenths of a degree. Such systems must be insensitive to pulse rate frequency (PRF) up to 5 KHz, emitter pulse height, emitter pulse width, emitter pulse rise time and carrier frequency.

The system requires the measurement of the time difference occurring between the incidence of electromagnetic energy as it strikes different receivers, e.g. the antennas in the wing tips of an aircraft. Although the system is described herein as applied to direction finding for TIAS, other applications for this short time, monopulse TOA system are possible, for example, in ultra short range radar for extreme low level missile guidance systems, precise ELINT adaptions in connection with direction finding of enemy emitters, aximuth bearing rate calculations, bench instrumentation for single occurrence, short time delays (pico second resolution), and locators for sonobouys in connection with ASW work.

Other applications will undoubtedly be suggested to workers in the field for the devices as described in the following specification.

and begins the measurement process and that the arrival of a pulse in channel B will stop this process. These two pulses, A and B, may be video pulses stripped off of radar pulses by detectors 16–18 after amplification by rf amplifiers 12, 14 placed in each channel. The time difference between pulse A and pulse B is computed as follows: the B channel is delayed in normalizer 22 such that channel A will always arrive first and thus acts as the turn-on pulse. When the time-to-height unit 24 turns on, an ultra fast linear ramp is started and as soon as pulse B arrives, this ramping is stopped. The amplitude of the ramp is then stored and worked upon by a time stretcher unit 26 which has the effect of magnifying the time between the arrival of pulse A and pulse B by a factor of about 2,500:1. The output of the stretcher unit, is fed to a shaper unit 28 which gates a 20 MHz clock (not shown) into a digital counter 30 for the correct stretched time. This count can now be converted into the desired readout, e.g. degrees, pico seconds, radians, etc.

Figure 2:
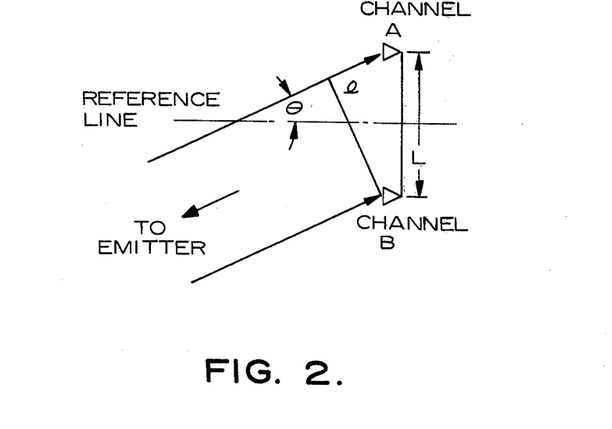
FIG. 2 is a simplified diagram showing the basic geometry of the antennae of FIG. 1.

In FIG. 2.

$L$ = distance between antennas
$\theta$ = angle from boresite to emitter
$\Delta t$ is delay between arrival at B and arrival at A
$\Delta t = (l/c)$ where $c$ = speed of light = $2.99776 \times 10^{10}$ cm/sec
$l = L \sin \theta$ The data in the table below illustrates the theoretical angle resolution in degrees for various angles from boresight and at different time resolutions. Initial information indicates that the optimum spacing of two wing antennas, for example, is about 24 feet.

| $\theta$ | 0.010 | 0.030 | 0.050 | 0.1 | 0.5 | 1.0 | $\Delta t$ in nanosec. |
|---|---|---|---|---|---|---|---|
| 1° | .0255 | .072 | .117 | .234 | 1.17 | 2.35 | resolution in degrees |
| 15° | .0261 | .0729 | .122 | .243 | 1.22 | 2.45 | |
| 30° | .0271 | .0813 | .136 | .271 | 1.37 | 2.75 | |
| 60° | .047 | .1412 | .236 | .473 | 2.44 | 5.10 | |

$L = 24$ feet

DESCRIPTION AND OPERATION

Figure 1:
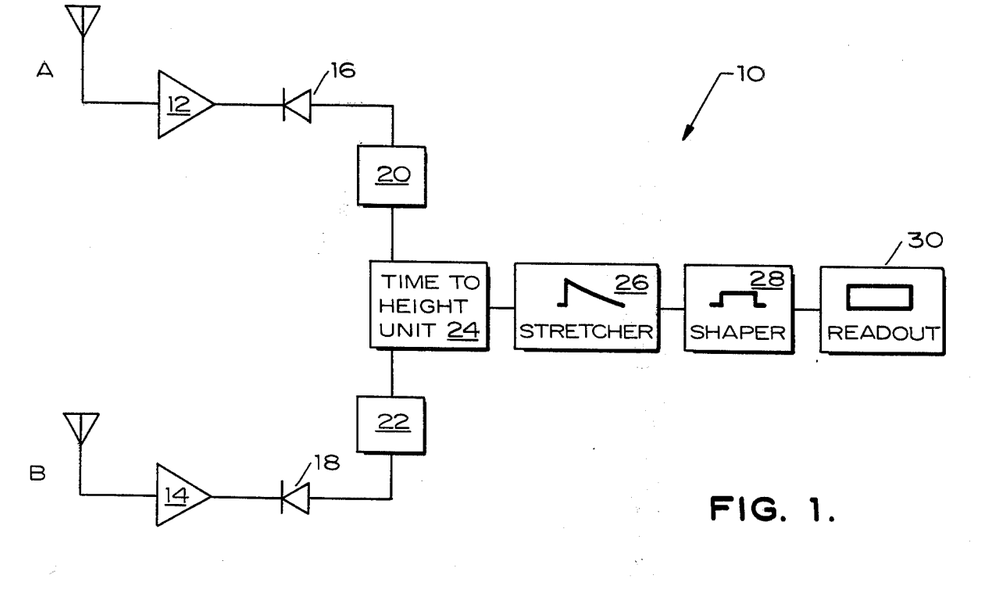
FIG. 1 is a block diagram of a system according to the invention.
Figure 3:
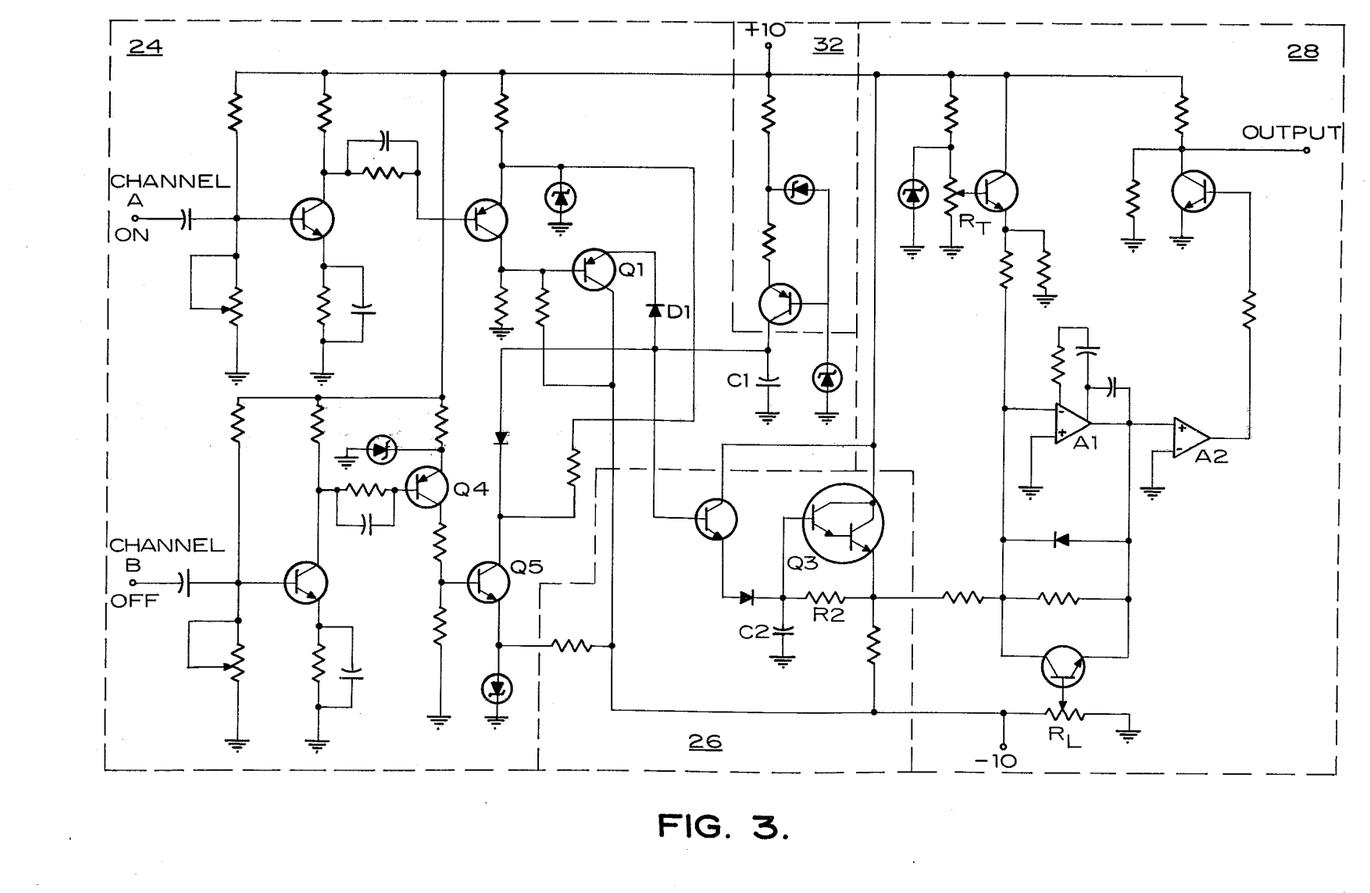
FIG. 3 is a circuit diagram of a basic time to height shaper unit usable with the system and following circuitry of FIG. 1.

The basic system 10 operates on a two channel input (see FIG. 1.) It is desired to read out the time difference of the occurrence of a pulse on the two channels A and B. Assume that a channel A pulse arrives first As shown in FIG. 3, the circuit 24 turns on with the arrival of the first pulse (channel A) and off with the second (channel B), thus measuring the time difference between the arrival of the leading edges of the two pulses.

The basic time measurement is made by charging a capacitor C1 at a fast linear rate during the interim period between the arrival of the two pulse leading edges. The first pulse starts the charging of the capacitor C1; the second pulse stops it. The result is a fast-rising ramp pulse whose height is proportional to the time delay differences. The system must be capable of operating with time delays up to about 50 nanosec. (Maximum time difference of A arrival before B is 24 + 25 nanosec delay = 49 nanosec.)

To generate this 50 nanosec ramp, capacitor C1 is charged from constant current source 32. If the maximum ramp height is to be 5 volts, for example, then the magnitude of the constant charge current, $I_1$, can be calculated from the following equation:

$$I_1 = c \frac{\Delta V}{\Delta t}$$

where $\Delta V$ is the voltage change during the time $\Delta t$. For a 100-pf capacitor to charge 5 volts in 50 nanosec, a current of 10 milliamps is required. Initially capacitor C1 has a steady-state value determined by the current from the current source 32 flowing through Q1 and D1. The ON pulse turns off Q1 and the current from the current source is then switched to charge C1 to a more positive value. Charging is stopped when transistor Q4 saturates, rapidly turning on transistor Q5, which shunt the current from the constant current source to $-5V$. Thus, it is possible to stop the charging by cutting off the current to the capacitor.

NORMALIZER CIRCUIT

Several circuits have been devised with the aim of producing some front-end circuitry unit that would take real-world video pulses from the detectors and attempt to convert them into as nice, sharp, clean pulses as those simulated with a pulse generator. This front end unit which must be insensitive to the video amplitude, pulse width, pulse rise time, or pulse repetition rate, must also be able to select the same point on each input pulse to provide valid time-difference data.

Figure 7:
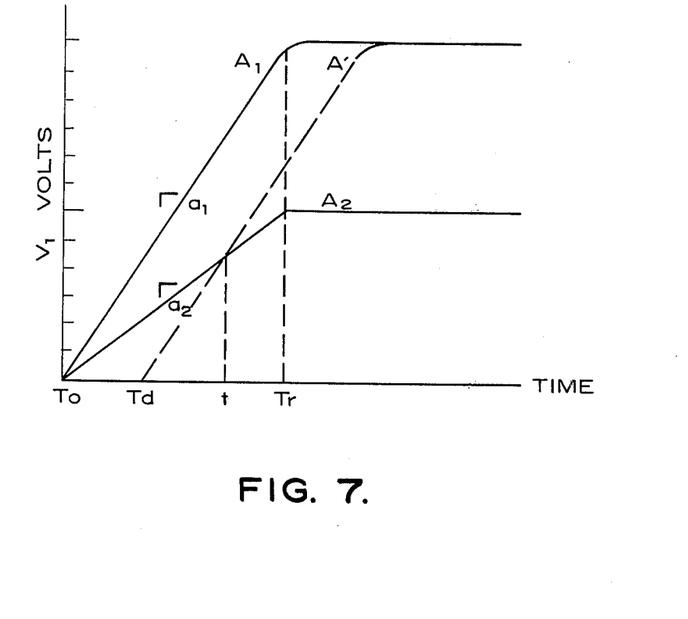
FIG. 7 is a graphical representation of the normalizing process taking place in FIG. 6.

Since the incoming video pulses in each channel will not be of the same amplitude, there is no straight forward method for fixed thresholding. Therefore, the circuit was designed to compare the pulse with itself in an attempt to eliminate the effects of pulse amplitude. FIG. 7 shows an idealized video pulse $A_1$ with some rise time $Tr$; however, the beginning of the pulse in time is obscured because of system noise. Pulse $A_2$ is pulse $A_1$ divided by some factor, $k$, and pulse front, $A'$, is pulse $A_1$ delayed by some time $Td$. If we express the rising wave front of $A_1$ as
$$Y_1 = a_1 t,$$
over the period it exists, where $a_1$ is the slope of $A_1$ or $V_1/Tr$, then the wavefront of $A_2$ is
$$Y_2 = a_2 t,$$
where
$$a_2 = k a_1,$$
and $A'$ also has a wavefront of
$$Y_1' = a_1(t - td).$$
If $A_2$ is compared to $A'$ to find the crossing point of these two lines, we find the point in time that
$$Y' = Y_2.$$
Then,
$$a_2 t = a_1 (t - Td)$$
$$k a_1 t = a_1 (t - Td).$$
Dividing through by $a_1$ gives
$$kt = (t - Td)$$
and, thus, the amplitude factor is eliminated. If we then let $k$ equal one half, then $$\frac{t}{2} = t - Td$$

and solving for $t$ we obtain
$$t = 2\, Td,$$
which indicates that, for the condition
$$(k = \tfrac{1}{2}),$$
the two wave fronts cross at twice the induced delay time, $Td$, independent of the pulse amplitude.

Figure 6:
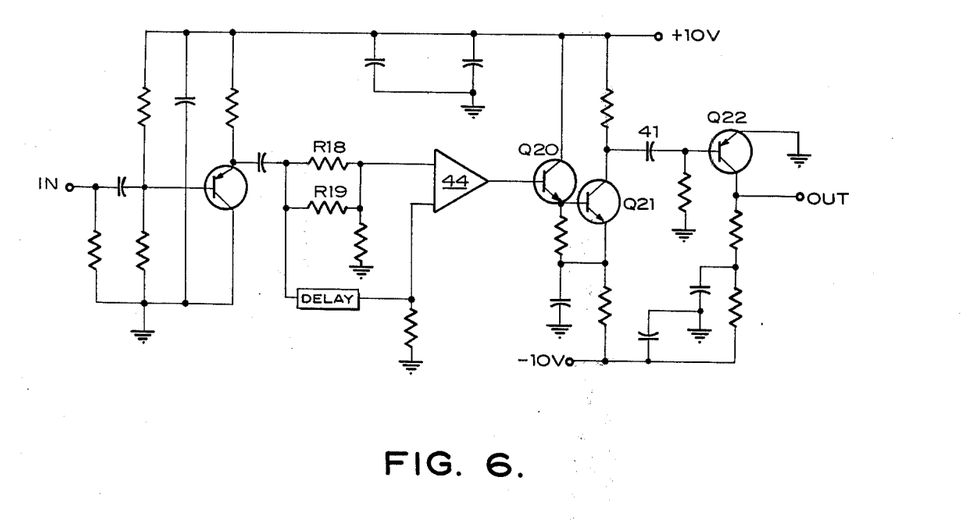
FIG. 6 is a normalizer usable in FIG. 1.

FIG. 6 is the circuit of the front-end unit, which is called a Normalizer since, theoretically, it performs the normalizing action of finding the same time point on each pair of input pulses. Each input pulse is divided in half by resistors R18 and R19, and the two wave fronts are compared by a Fairchild $\mu$710 voltage comparator 44. The rise time of the output of the comparator is increased by using the DC amplifier consisting of Q20 and Q21. A 500 pF capacitor 41 couples the wave front into a Class C amplifier, Q22, which produces the input to the time-to-height unit.

Second Normalizer Concept. (FIG. 8)

Figure 8:
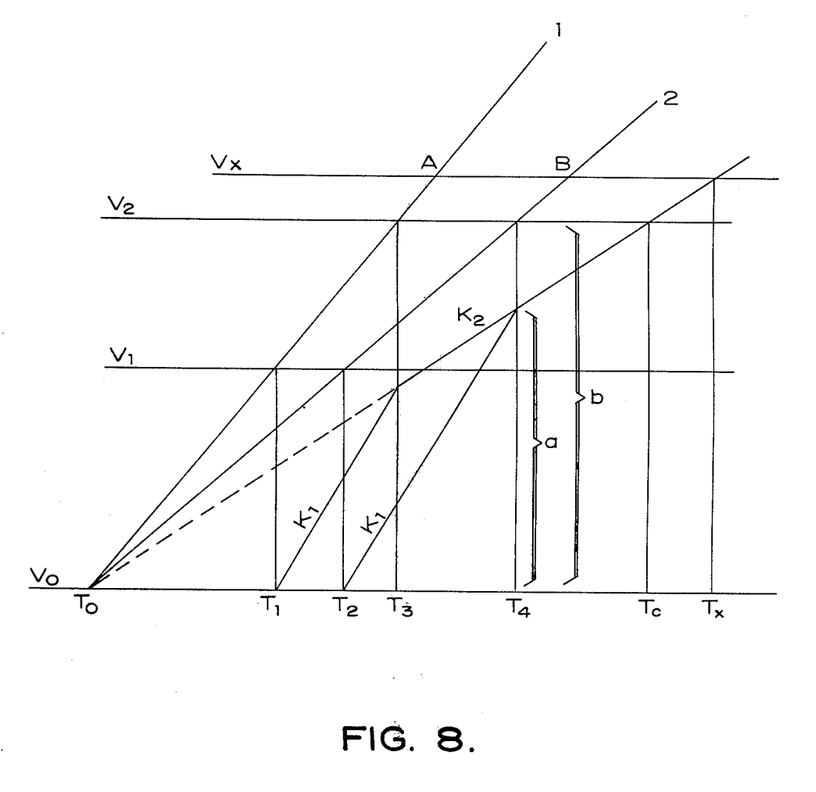
FIG. 8 is a graphical representation of a second normalizer process for determining identical times on video pulses.

It is apparent that, if the rate at which the two functions approach each other is increased, detection of the crossing by the comparator may be simplified. Also, if more data points on the wave front are used in making the decision, a better indication of pulse arrival time may be obtained. For example using two points on the wave front instead of one, a better position of pulse arrival in time is obtained. FIG. 8 shows the basic concept for this normalizing approach. Assume the arrival of wave front No. 1, which begins at time $T_o$ with a slope of A volts per second. Two fixed thresholds, $V_1$ and $V_2$, have been established within the range of pulse amplitudes to be processed. Wave front No. 1 crosses $V_1$ at time $T_1$, such that
$$V_1 = AT_1,$$
and crosses $V_2$ at time $T_3$. If a ramp of slope $K_1$ is begun at $T_1$ and continues until $T_3$, at $T_3$ the ramp's slope is changed to $K_2$, such that $K_1 > K_2$. The ramp now continues to this new slope until it reaches a value of $V_x$ at which time a comparator detects the value of $V_x$ and emits a pulse. This pulse is the output pulse of the noramlizer and is fed into the time-to-height unit. The time between $T_o$ and $T_x$ is fixed and remains the same for any input wave front that crosses threshold $V_2$ before time $T_c$. For example, if we assume wave front No. 2 arriving at $T_o$, but with a slope B such that B<A (B could have been greater than A) we find that
$$V_1 = BT_2$$
and
$$V_2 = BT_4.$$
Because A>B, the time difference $T_3 - T_1$ is less than $T_4 - T_2$, but this is compensated for by the ratio of $K_2/K_1$. Further it is observed that, if slope $K_2$ is projected back, it will intersect $V_o$ at $T_o$. The relationship of the slopes $K_1$ and $K_2$ is calculated thus,
$$V_2 = BT_4 = AT_3 = \text{Segment } b \text{ in FIG. 8}$$

$$\text{Slope } B = \frac{V_2 - V_1}{T_4 - T_2}$$

$$K_2 T_4 = \text{Segment } a \text{ in FIG. 8} = K_1 (T_4 - T_2)$$
From the above, it can be shown that $$\frac{K_2 V_2}{B} = K_1 \frac{(V_2 - V_1)}{B}$$

Dividing by B gives
$$K_2 V_2 = K_1 (V_2 - V_1)$$
or $$K_2 = K_1 \frac{(V_2 - V_1)}{V_2}$$

Therefore, $$\frac{K_2}{K_1} = 1 - \frac{V_1}{V_2}$$

TIME MULTIPLICATION

It is now desirable to resolve the magnitude of the voltage that appeared on capacitor C1 at the time it was discharged into some time frame — a timer stretcher. This may be done by transferring the voltage on C1 to a second capacitor, C2, and then discharge C2 at a constant rate that is much slower than the first capacitor's charge rate. This approach effectively multiplies times of short durations into a time scale that can be handled by present components.

Now, let a sensor mark the time when this second capacitor, C3 departs from, and returns to, its original level of charge. The result is a pulse whose width is proportional to the height generated by the fast ramp found on $C_1$. Further, the pulse width is related to the charge time of the fast ramp by a multiplication factor equal to the ratio of the discharge rate of $C_2$ to the charge rate of $C_1$ such that $$\frac{\Delta t_2}{\Delta t_1} = \frac{C_2 I_1}{C_1 I_2}$$

For example, if the discharge rate of C2 is 5,000 times slower than the charge rate of C1, then each 50-nanosec increment of discharge time will represent a 10-picosec increment of delay between pulses. If a 20-MHz clock is used to count during this output pulse width, it is possible to resolve 50-nanosec charges in the discharge time. Thus, each clock pulse theoretically represents 10 picosec of delay between wavefront of pulse A and wavefront of pulse B.

A simple but linear circuit is used for the discharge circuit. In operation, diode D2 allows capacitor C2 to be charged by transistor Q2 by approximately the same value as C1. When C1 is discharged, D2 becomes reverse biased, and capacitor C2 is then isolated from the emitter of Q2. The Darlington pair, Q3, in the emitter-follower configuration draws essentially no current but does hold a fixed voltage of 1.2 volts on resistor R2. The current that generates this constant voltage is supplied by capacitor C2. Since the current flow is constant, capacitor C2 is discharged linearly.

PULSE SHAPING

An operational amplifier configured as a comparator was used to form a pulse equal in length to the time of the slow ramp. To aid in the detection of the crossing of the trailing edge of this slow ramp and to decrease the jitter thus encountered, a second amplifier, A1, was added in front of A2 to increase the slope in the region where it crosses the threshold. The gain of amplifier A1 was set at 10. Thus, A1 would saturate each time C2 was charged and then, as the slow ramp decreased, the amplifier would come out of saturation and amplify the ramp in the vicinity of the threshold level, which is set by potentiometer $R_T$. To overcome the undue delay that occurs while the amplifier is coming out of saturation, the output of A1 was limited to a minimum value of 0 volts and to a maximum level set by potentiometer $R_L$.

READOUT CIRCUITRY

The readout circuit (FIG. 4) is designed to give a readout proportionate to the length of the pulse produced by amplifier A2. This unit accepts the pulse from the pulse stretching unit, turns itself on, counts the number of time increments under the incoming pulse width, transfers this count to its output register, clears its counter, then shuts itself off and waits for the next pulse in. If data output is too rapid for manual recording, a control line P12 may be added to lock out the next input pulse when necessary.

Figure 4:
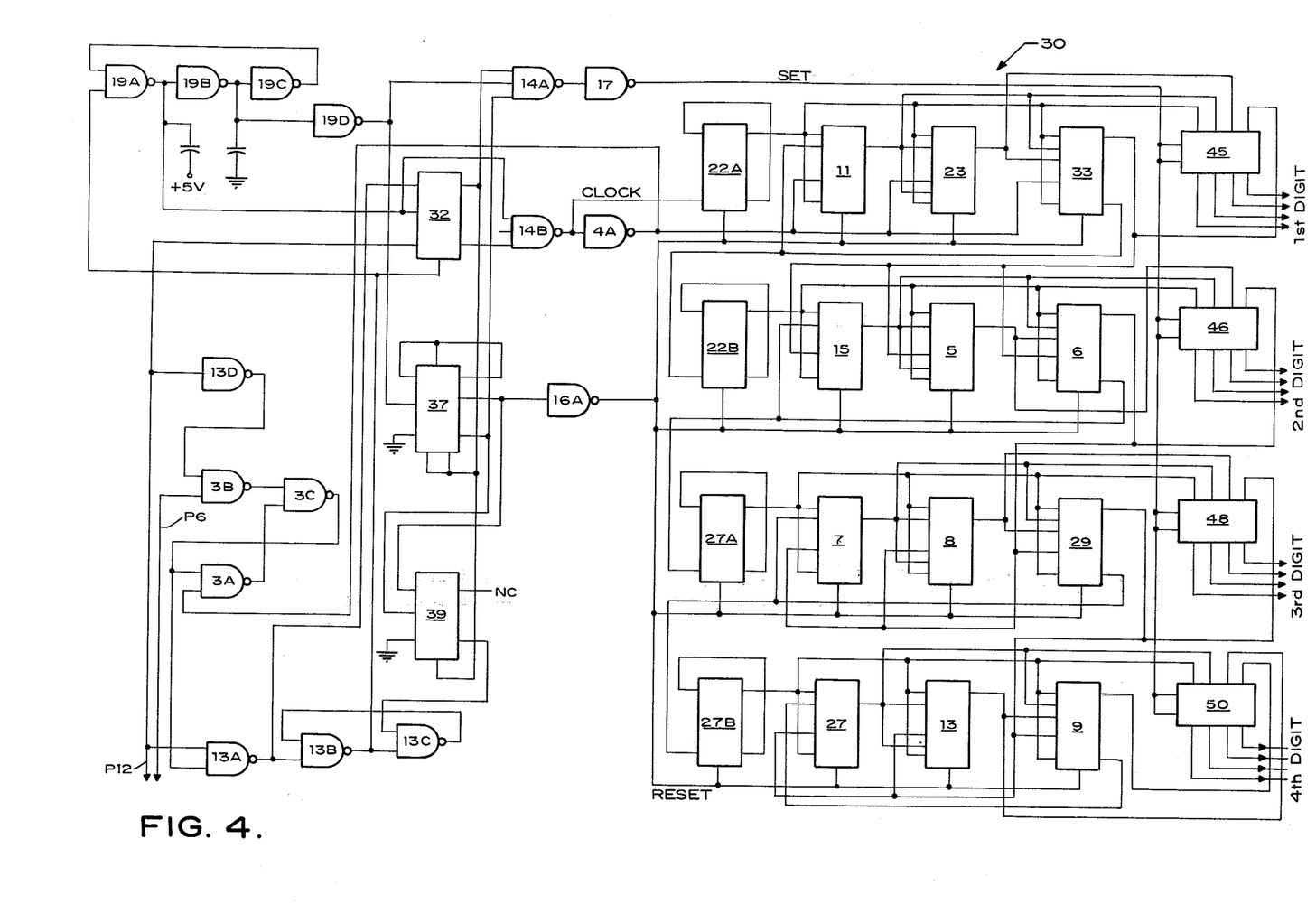
FIG. 4 is a logic diagram of the digital readout portion of FIG. 1.

Basically, the readout circuit consists of a 20-MHz clock (gates 19A, 19B, and 19C), which is switched on when the input line, Pin 6, goes positive. The clock pulse is then passed through a buffer gate, 14B, which in turn drives a four-stage BCD counter, which consists of flip-flops 22A, 11, 23, and 24 for the first decade; 22B, 15, 5, and 6 for the second decade; 27A, 7, 8, and 29 for the third decade; and 27B, 20, 13, and 9 for the fourth decade. The counter continues to count until input line 6 goes negative. The next clock pulse sets flip-flop 32, which disables the counter clock through gate 14B, thus stopping the count; the next half pulse is fed through gates 14A and 16 to set the number in the counter into the output register consisting of latches 45, 46, 48, and 50. The next full clock pulse sets flip-flop 37, which enables the next half pulse to reset the counter to zero. This allows flip-flop 39 to be set, which shuts off the clock. The output of the latches is fed into a decimal display so that the magnitude of the count can be observed. All the circuits except the readout circuit have been combined on a common ground plane to minimize noise.

Figure 5:
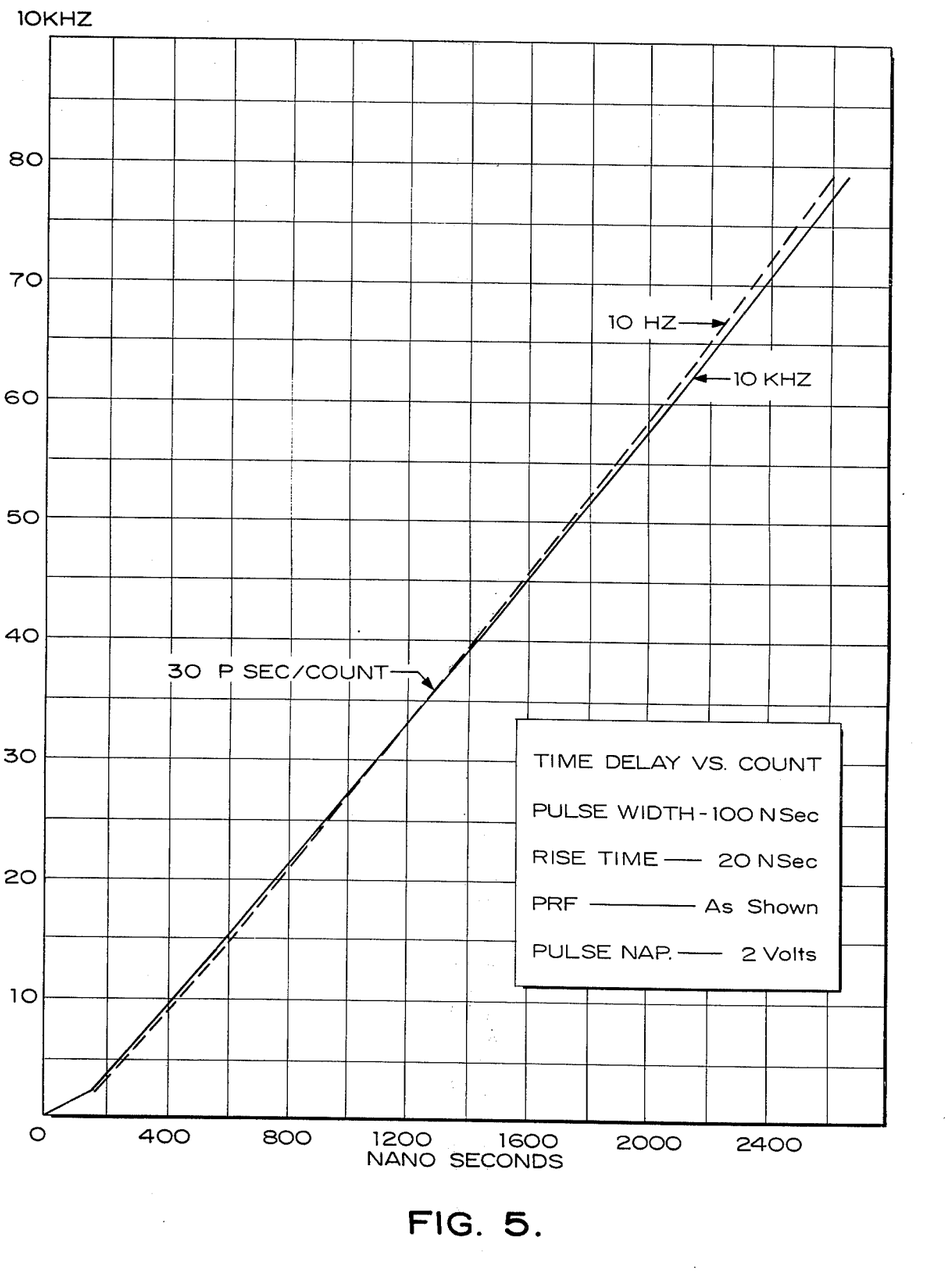
FIG. 5 is a graphical representation of the linearity of two pulse rates.

A plot of time delay versus count at a 10-Hz PRF and a 10-kHz simulated PRF is presented in FIG. 5. The measurements are taken, for example, by splitting the output of a pulse generator into two channels and then adding various delays to channel B to obtain the different counts. A trombone delay calibrated in 10-picosec steps is used for making the fine delay-time change readings. The resolution in picoseconds per count may be determined by reading the count change over 1,000-picosec intervals.

A circuit manufactured according to the invention was able to resolve 30 picosec increments in time, which would convert to a spatial direction-finding accuracy of about 0.08 degree, as shown in Table 1. This time resolution may be adjusted by changing the length of the stretching ramp; i.e., by changing capacitor C2. In an experiment, C2 was increased from 120 to 560 pF, resulting in a resolution of about 7 picosec/clock count. Time increments below this size are difficult to measure because jitter degrades repeatability to an extent that makes the reading of time increments meaningless.

From the foregoing it will be recognized that a system has been provided for determining the direction of an emitter with respect to a fixed reference upon receipt of a single electromagnetic pulse from the emitter.

What is claimed is:

1. A system for finding the direction of an emitter of electromagnetic pulses comprising:
    first receiving means including a first antenna connected to circuitry means defining a CHANNEL A;
    second receiving means including a second antenna spaced from said first antenna and connected to circuitry means defining a CHANNEL B;
    each said channel including a NORMALIZER circuit unit receiving electromagnetic pulses from said antenna and having an output;
    A TIME TO HEIGHT UNIT receiving the output from each of channels A and B and outputting a new pulse having characteristics representative of the time difference between receipt of said electromagnetic pulse at the antenna of channel A and the receipt thereof at the antenna of channel B;
    each said NORMALIZER circuit including;
        pulse divider means halving said received pulse, delay means repeating said pulse after a predetermined time, voltage comparison means receiving and comparing the half pulses with said repeated pulses, amplifier means receiving the output of said comparison means and producing an input to said TIME TO HEIGHT UNIT; and readout means responsive to said new pulse providing a readout based on said time difference and indicative of the direction of the emitter with respect to a reference.

2. The system of claim 1 wherein the antennae are situated on the airframe of an aircraft.

3. The system of claim 2 wherein said antennae are spaced apart by about 24 feet.

4. The system of claim 1 wherein receipt of a single signal pulse in channel A operates to turn on said TIME TO HEIGHT UNIT and receipt of the same said signal pulse in channel B operates to turn off said UNIT.

5. The system of claim 4 wherein delay means is included in circuit B to assure that the arrival at said UNIT of said pulse through channel B will always be later than the arrival of said pulse through channel A.

6. The system of claim 4 wherein the time differences between pulses is determined by a circuit including:

a first capacitor having a fast linear charging rate; and a second capacitor having a constant discharge rate said circuit being effective to; (a) begin charging said first capacitor upon arrival of said pulse from Channel A, (b) stop the charging of said first capacitor upon arrival of said pulse from Channel B, and (c) transfer the charge from said first capacitor to said second capacitor;

said second capacitor discharging at a constant rate slower than the charge rate of said first capacitor and thus producing a longer pulse having a direct linear relationship to the output of said first capacitor.

* * * * *